No. 704,625. Patented July 15, 1902.
W. H. FOX.
HOSPITAL BED.
(Application filed Sept. 15, 1900.)
(No Model.)

Witnesses
Inventor
W. H. Fox

UNITED STATES PATENT OFFICE.

WILLIAM H. FOX, OF TORONTO, CANADA, ASSIGNOR TO HARRY L. PIPER, OF TORONTO, CANADA.

HOSPITAL-BED.

SPECIFICATION forming part of Letters Patent No. 704,625, dated July 15, 1902.

Application filed September 15, 1900. Serial No. 30,204. (No model.)

*To all whom it may concern:*

Be it known that I, WILLIAM H. FOX, a subject of the Queen of Great Britain, residing at 191 College street, in the city of Toronto, in the county of York and Province of Ontario, Canada, have invented certain new and useful Improvements in Hospital-Beds; and I hereby declare that the following is a full, clear, and exact description of the same.

This invention relates to a hospital-bed consisting of a stationary bed-frame and a vertically-movable stretcher-frame supported from the bed-frame and operated by a lifting mechanism; and the object of the invention is to so arrange this mechanism that the stretcher-frame can be easily raised to any desired elevation within the range of the apparatus and maintained either in a horizontal position or at an inclination to the bed-frame and to so arrange the lifting mechanism that it can be easily operated, as hereinafter more fully set forth, and more particularly pointed out in the claim.

Figure 1:
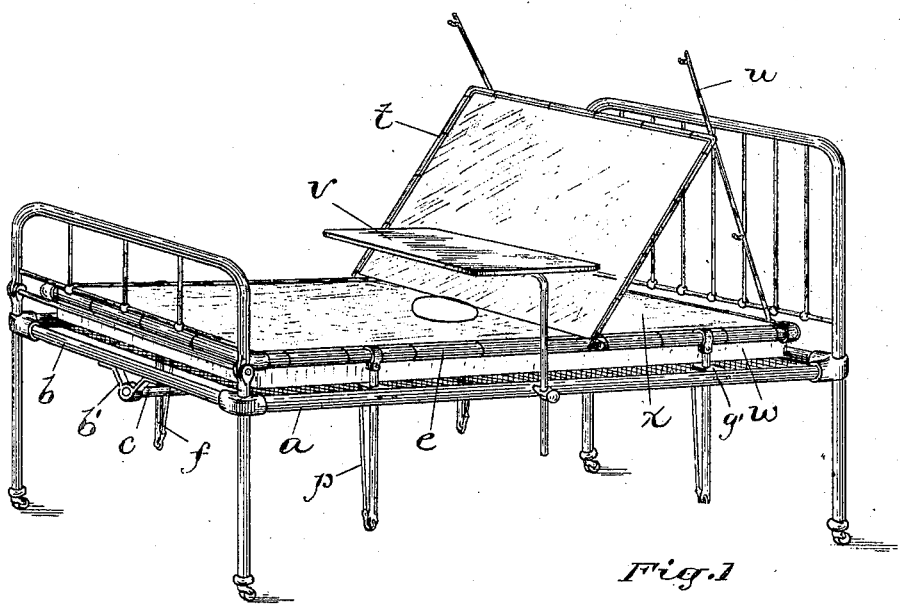
Figure 2:
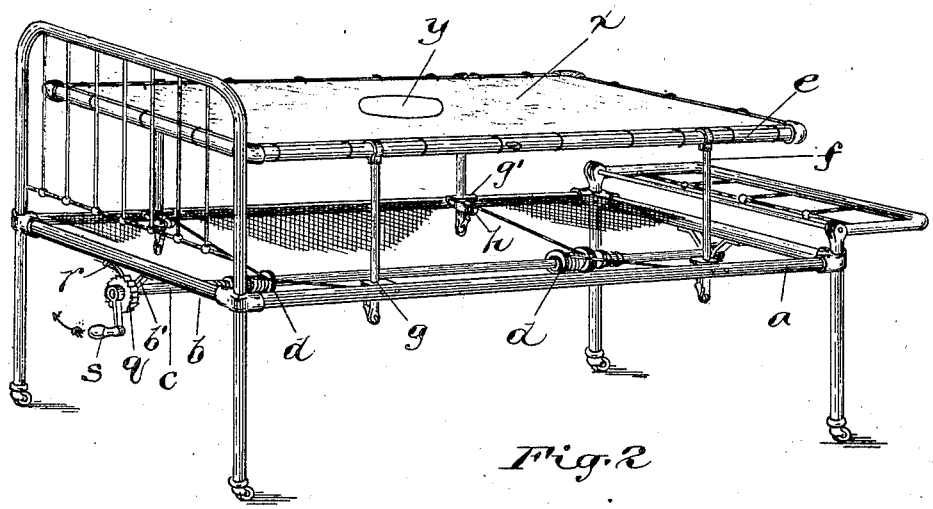
Figure 3:
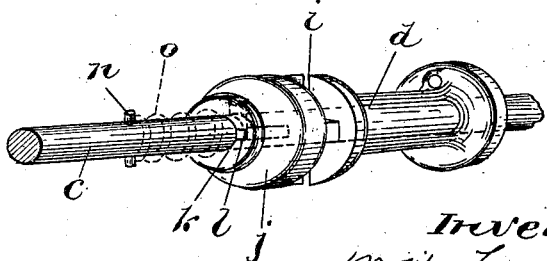

In the drawings, Figure 1 is a perspective view of the hospital-bed, showing the stretcher-frame resting on the top of the bed-frame. Fig. 2 is a similar view showing the stretcher-frame elevated. Fig. 3 is a detail perspective view of the operating-shaft and clutch mechanism.

Like letters of reference refer to like parts throughout the specification and drawings.

The bed-frame consists of side rails $a$ and ends $b$, to which are rigidly connected the side rails at a suitable distance above the floor. Depending from the middle of the ends $b$ are bearings $b'$, and journaled in the bearings $b'$ below the side rails $a$ is a longitudinal shaft $c$, upon which are loosely mounted two or more winding-pulleys $d$.

Supported above the side rails $a$ is a rectangular stretcher-frame $e$, provided with downwardly-directed standards $f$, passing vertically through holes $g$ in guide-brackets $g'$, connected to the inner side of the side rails $a$. Connected to the brackets $g'$ are idlers $h$, opposed to the winding-pulleys $d$. The inner side face of each of the pulleys $d$ is provided with a clutch member $i$, which interlocks with a sliding clutch member $j$, mounted on the shaft $c$. The bore of each sliding clutch member $j$ is provided with a groove $k$ to receive the spline $l$ of the shaft $c$. The shaft $c$ is provided with a stop or stops $n$ intermediate the sliding clutch members $j$, and bearing against the stop or stops $n$ and the inner faces of the sliding clutch members $j$ are springs $o$ to normally hold the sliding clutch members in engagement with the clutch members $i$ of the pulleys $d$. Each pair of standards $f$ is in alinement with its respective pulley $d$ and idlers $h$. Connected to the lower end of each standard $f$ is a cord or cable $p$, which passes over its respective idler $h$ and is wound on its respective pulley $d$. Rigidly mounted on the shaft $c$ contiguous to one end is a ratchet-wheel $q$, and pivoted to the bed-frame is a dog $r$, engaging the teeth of the ratchet-wheel $q$. Rigidly mounted on one end of the shaft $c$ is a crank $s$, by means of which the shaft and pulleys are rotated. By rotating the shaft $c$ in a forward direction—that is, in the direction indicated by arrows—the cords or cables $p$ are wound on the pulleys $d$, and by disengaging the dog $r$ from the teeth of the ratchet-wheel $q$ the shaft can be rotated in the reverse direction to unwind the cords. The winding of the cords upon the pulleys raises the standards a distance proportionate to the amount of the cord wound upon the pulleys.

Pivoted to the sides of the stretcher-frame $e$ is a head-rest $t$, fitted with a support $u$ to hold it at any desired elevation, and connected to the bed-frame is an adjustable table $v$.

In the operation of the invention the sliding clutch members $j$ are normally held in engagement with the clutch members $i$ of the pulleys $d$ by means of the springs $o$. The engagement of the sliding clutch members $j$ with the clutch members $i$ causes the revolution of the pulleys $d$ and shaft $c$. During the revolution of the shaft $c$ in a forward direction the cords or cables are wound on the pulleys to lift the standards and stretcher-frame, which are raised to any desired elevation and held at such elevation by the engagement of the dog $r$ with the teeth of the ratchet-wheel. By disengaging the dog from the teeth of the ratchet-wheel the weight of the occupant of the stretcher forces the stretcher-frame down to the top of the bed-frame, upon which it is supported, and unwinding the cords from the pulleys. If it is desired to raise one end only of the stretcher-frame, the sliding clutch member is disengaged from the pulley at the opposite end, permitting that pulley to remain stationary while the other pulley is winding the cords at the other end of the bed. By means of this construction it is possible to raise the stretcher-frame to any predetermined elevation within the range of the apparatus, either horizontally or at an inclination to the bed-frame, and to rigidly hold it in such position until it is again lowered.

Supported upon the bed-frame is a mattress $w$, and connected to the stretcher-frame is a textile fabric bottom $x$, having a central opening $y$. The patient is laid upon the bottom $x$, and when the stretcher-frame is in its lowermost position rests upon the mattress $w$. When the stretcher-frame is raised, the patient is solely supported by the bottom $x$, which must be of sufficient strength to firmly sustain his or her weight. When the patient desires to use the bed-pan, the stretcher-frame is raised and the bed-pan is placed under the opening $y$ without interfering with his or her position or comfort.

This bed is not only suitable for cases of sickness and accident, but it can also be used for surgical operations, the patient being easily and readily handled without the slightest additional discomfort to him or her or to the person operating the bed.

Having thus fully described my invention, what I claim as new, and desire to secure by Letters Patent, is—

A hospital-bed embracing in its construction a stationary bed-frame, vertical guides formed in the stationary bed-frame, a vertically-movable stretcher-frame supported above the stationary bed-frame, standards depending from the stretcher-frame movably held by the guides of the stationary bed-frame, a longitudinal shaft journaled in bearings connected to the stationary bed-frame intermediate the sides, winding-pulleys loosely mounted on the longitudinal shaft, idlers connected to the stationary bed-frame intermediate the longitudinal shaft and standards of the stretcher-frame, lifting-cords passing over the idlers and connected to the standards and winding-pulleys, clutch members on the side face of the winding-pulleys and movable clutch members mounted on and revoluble with the longitudinal shaft to engage with the clutch members of the winding-pulleys, substantially as specified.

Toronto, August 3, 1900.

W. H. FOX.

In presence of—
C. H. RICHES,
J. E. CAMERON.